US008830969B2

(12) United States Patent
Yang et al.

(10) Patent No.: US 8,830,969 B2
(45) Date of Patent: Sep. 9, 2014

(54) CARRIER RECONFIGURATION IN MULTI-CARRIER AGGREGATION

(75) Inventors: Suck Chel Yang, Anyang-si (KR); Joon Kui Ahn, Anyang-si (KR); Dong Youn Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 324 days.

(21) Appl. No.: 13/384,100

(22) PCT Filed: Jul. 15, 2010

(86) PCT No.: PCT/KR2010/004623
§ 371 (c)(1), (2), (4) Date: Jan. 13, 2012

(87) PCT Pub. No.: WO2011/008037
PCT Pub. Date: Jan. 20, 2011

(65) Prior Publication Data

US 2012/0106460 A1 May 3, 2012

Related U.S. Application Data

(60) Provisional application No. 61/225,892, filed on Jul. 15, 2009.

(30) Foreign Application Priority Data

Jul. 15, 2010 (KR) ........................ 10-2010-0068203

(51) Int. Cl.
*H04J 3/00* (2006.01)

(52) U.S. Cl.
USPC ........................................... 370/336; 370/391

(58) Field of Classification Search
None
See application file for complete search history.

(56) References Cited

U.S. PATENT DOCUMENTS

2006/0280142 A1 12/2006 Damnjanovic et al.
2010/0118720 A1* 5/2010 Gauvreau et al. ............. 370/252
2010/0215011 A1* 8/2010 Pan et al. ...................... 370/329
2010/0234037 A1* 9/2010 Terry et al. .................... 455/450
2010/0296389 A1* 11/2010 Khandekar et al. ........... 370/216
2010/0296488 A1* 11/2010 Kuo ............................. 370/332
2010/0303039 A1* 12/2010 Zhang et al. .................. 370/331
2012/0099439 A1* 4/2012 Baldemair et al. ............ 370/241
2014/0016506 A1* 1/2014 Gauvreau et al. ............. 370/254

OTHER PUBLICATIONS

3GPP TSG RAN WG1, R1-083545, 11., ERI, "Structure and Configuration of Component Carriers in Carrier Aggregation", Meeting #54bis, Sep. 29-Oct. 3, 2008. pp. 1-2.
3GPP TSG RAN WG1, R1-091065, Agenda 12.1, "PDCCH Structure for Multiple Component Carriers", 56, Feb. 9-13, 2009.4 pages.
3GPP TSG RAN2, R2-093697, NEC, "Component Carrier Configuration/Activitation for Carrier Aggregation," Meeting #66bis, USA, Jun. 29-Jul. 3, 2009. 3 pages.

* cited by examiner

*Primary Examiner* — Phirin Sam
(74) *Attorney, Agent, or Firm* — Birch, Stewart, Kolasch & Birch, LLP

(57) ABSTRACT

The present invention relates to a wireless communication system which supports carrier aggregation. In detail, the present invention relates to a method and apparatus, wherein a mobile station changes a component carrier (CC) in a wireless communication system that supports carrier aggregation. The method comprises the steps of: receiving, from a base station, a CC reconfiguration command via one or more first preconfigured CCs; reconfiguring, in accordance with the CC reconfiguration command, CC-related information to change one or more first preconfigured CCs to a second CC; and transmitting a signal indicating the completion of CC reconfiguration to the base station after the reconfiguration of the CC-related information.

8 Claims, 20 Drawing Sheets

User Equipment
Base Station
CC Reconfiguration Command S1210
S1220 Response to CC Reconfiguration Command
Reconfiguration/Resynchronization for Target CC S1230
S1240 CC Reconfiguration Completion
Response to CC Reconfiguration Completion S1250

(a) User-Plane Protocol Stack (b) Control-Plane Protocol Stack

Source CC Pair (#1) without Reconfiguration
Target CC Pair
User Equipment
Base Station
User Equipment
Base Station
CC Reconfiguration
Response
Reconfiguration /Synchronization for Target DL CC
SR
UL Grant (PDCCH)
CC Reconfiguration Completion (PUSCH)
ACK/NACK (PHICH)
S1810
S1820
S1830
S1840
S1850
S1860
S1870
CC Reconfiguration
DL#1
UL#1
DL#2
UL#2
DL#3
UL#3
Source CC Pair #1
Source CC Pair #2
Target CC Pair

CARRIER RECONFIGURATION IN MULTI-CARRIER AGGREGATION

This application is the National Phase of PCT/KR2010/004623 filed on Jul. 15, 2010, which claims priority under 35 U.S.C. 119(e) to U.S. Provisional application No. 61/225,892 filed on Jul. 15, 2009, and under U.S.C. 119(a) to Patent application No. 10-2010-0068203 filed in the Republic of Korea on Jul. 15, 2010, all of which are hereby expressly incorporated by reference into the present application.

FIELD OF THE INVENTION

The present invention relates to a wireless communication system. And, more particularly, the present invention relates to a method and apparatus for carrier reconfiguration in multi-carrier aggregation.

BACKGROUND ART

Wireless communication systems are evolving extensively in order to provide diverse types of communication services, such as audio and video data, and so on. Generally, a mobile communication system corresponds to a multiple access system that shares available system resource (e.g., bandwidth, transmission power, and so on) so as to be capable of supporting communication between multiple users. Examples of the multiple access system include a CDMA (code division multiple access) system, a FDMA (frequency division multiple access) system, a TDMA (time division multiple access) system, an OFDMA (orthogonal frequency division multiple access) system, an SC-FDMA (single carrier frequency division multiple access) system, an MC-FDMA (multi carrier frequency division multiple access) system, and so on.

DETAILED DESCRIPTION OF THE INVENTION

Technical Objects

An object of the present invention is to provide a method and apparatus for reconfiguring carrier waves in a wireless communication system supporting a Carrier Aggregation (CA).

The technical objects of the present invention will not be limited only to the objects described above. Accordingly, additional technical objects of the present application will be set forth in part in the description which follows and in part will become apparent to those having ordinary skill in the art upon examination of the following or may be learned from practice of the present application.

Technical Solutions

In an aspect of the present invention, a method of reconfiguring Component Carriers (CCs) at a user equipment in a wireless communication system supporting carrier aggregation is provided. The method includes the steps of receiving a CC reconfiguration command from a base station through at least one of pre-determined first CCs; reconfiguring CC related information in order to change at least one of the pre-determined first CCs to a second CC in accordance with the CC reconfiguration command; and transmitting a signal to a base station after the CC related information is reconfigured, the signal indicating that CC reconfiguration has been completed.

Herein, the signal indicating that CC reconfiguration has been completed may include a dedicated random access preamble. In this case, the method may further include a step of receiving a PDCCH (Physical Downlink Control Channel) indicating a response to the CC reconfiguration completion, after transmitting the dedicated random access preamble. Also, the PDCCH may not include scheduling information.

Herein, the signal indicating that the CC reconfiguration has been completed may be transmitted to the base station through a non-reconfigured CC, among the at least one pre-determined first CC. The method may further include a step of receiving a request signal requesting for information on a CC reconfiguration status from the base station. And, herein, the signal indicating that the CC reconfiguration has been completed may be transmitted to the base station as a response to the request signal.

In another aspect of the present invention, a user equipment includes an RF (RF) unit configured to transmit and receive radio signals to and from a base station, the base station supporting carrier aggregation; and a processor configured to receive a CC reconfiguration command from a base station through at least one of pre-determined first CCs, to reconfigure CC related information in order to change at least one of the pre-determined first CCs to a second CC in accordance with the CC reconfiguration command, and to transmit a signal to the base station after the CC related information is reconfigured, the signal indicating that CC reconfiguration has been completed.

Herein, the signal indicating that CC reconfiguration has been completed may include a dedicated random access preamble. In this case, the processor may be configured to receive a PDCCH (Physical Downlink Control Channel) indicating a response to the CC reconfiguration completion, after transmitting the dedicated random access preamble. Also, the PDCCH may not include scheduling information.

Herein, the processor may also be configured to transmit the signal indicating that the CC reconfiguration has been completed to the base station through a non-reconfigured CC, among the at least one pre-determined first CC. Also, the processor may receive a request signal requesting for information on a CC reconfiguration status from the base station. And, herein, the signal indicating that the CC reconfiguration has been completed may be transmitted to the base station as a response to the request signal.

Effects of the Invention

According to the exemplary embodiments of the present invention, carrier waves may be efficiently reconfigured in a wireless communication system supporting carrier aggregation.

The effects that may be gained from the embodiment of the present invention will not be limited only to the effects described above. Accordingly, additional effects of the present application will be set forth in part in the description which follows and in part will become apparent to those having ordinary skill in the art upon examination of the following or may be learned from practice of the present application. More specifically, unintended effects obtained upon the practice of the present invention may also be derived by anyone having ordinary skill in the art.

BRIEF DESCRIPTION OF THE DRAWINGS

The accompanying drawings, which are included to provide a further understanding of the invention and are incorporated in and constitute a part of this application, illustrate embodiments of the invention and along with the description serve to explain the spirit and scope (or principle) of the invention.

BEST MODE FOR CARRYING OUT THE PRESENT INVENTION

Hereinafter, the structure, operation, and other characteristics according to the preferred embodiments of the present invention will now be described in detail with reference to the accompanying drawings and the details given in the accompanying drawings. Hereinafter, the preferred embodiments of the present invention correspond to examples wherein the technical characteristics of the present invention are applied in a 3GPP system.

Figure 1:
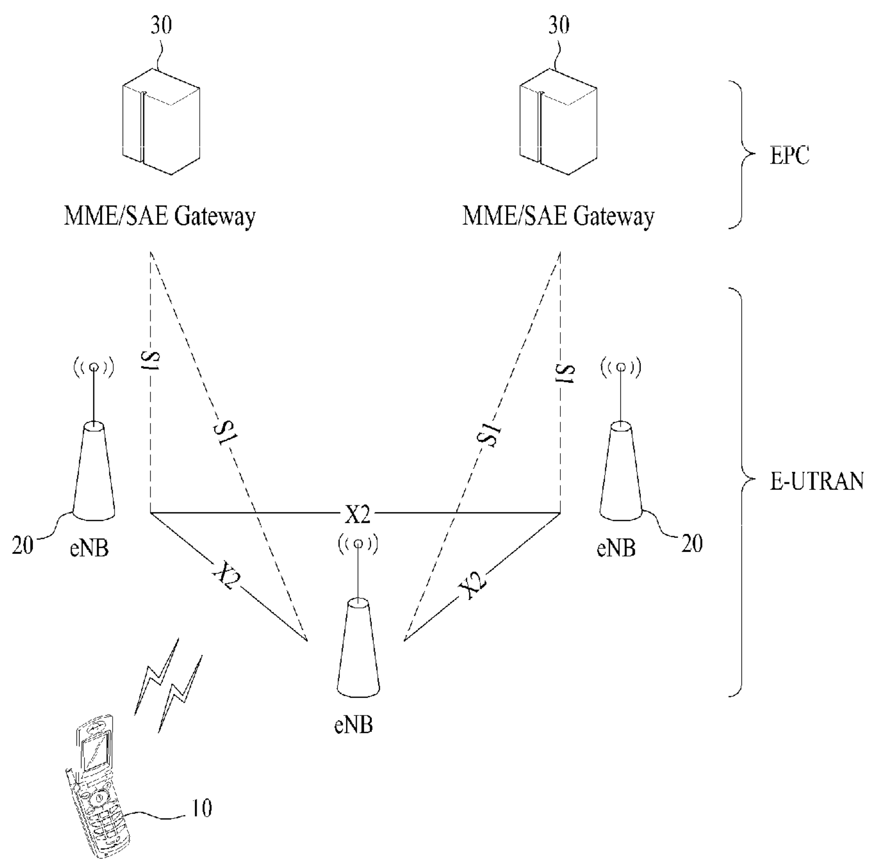
FIG. 1 illustrates an exemplary network structure of an E-UMTS (Evolved Universal Mobile Telecommunications System).

FIG. 1 illustrates an exemplary network structure of an E-UMTS. Herein, the E-UMTS may also be referred to as an LTE system. For details of the technical specifications of the UMTS and the E-UMTS, reference may be made to Release 7 and Release 8 of "3rd Generation Partnership Project; Technical Specification Group Radio Access Network".

Referring to FIG. 1, the E-UMTS includes a User Equipment (UE)(10), base stations (eNode B; eNB)(20), and an Access Gateway (AG), which is located at an end of a network (E-UTRAN) and connected to an external network. The base stations can simultaneously transmit multiple data streams for a broadcast service, a multicast service and/or a unicast service. One or more cells may exist for one base station. One cell is set to one of bandwidths of 1.25, 2.5, 5, 10, and 20 Mhz to provide a downlink or uplink transport service to several user equipments. Different cells may be set to provide different bandwidths. Also, one base station controls data transmission and reception for a plurality of user equipments. The base station transmits Downlink (DL) scheduling information of downlink data to the corresponding user equipment to notify information related to time and frequency domains to which data will be transmitted, encoding, data size, and HARQ (Hybrid Automatic Repeat and reQuest). Also, the base station transmits Uplink (UL) scheduling information of uplink data to the corresponding user equipment to notify information related to time and frequency domains that can be used by the corresponding user equipment, encoding, data size, and HARQ. An interface for transmitting user traffic or control traffic can be used between the base stations. A Core Network (CN) may include the AG and a network node or the like for user registration of the UE. The AG manages mobility of a UE on a TA (Tracking Area) unit basis, wherein one TA unit includes a plurality of cells. In the description of the present invention, a downlink will indicate a communication from a base station (20) to a user equipment (10), and an uplink will indicate a communication from a user equipment to a base station.

Figure 2:
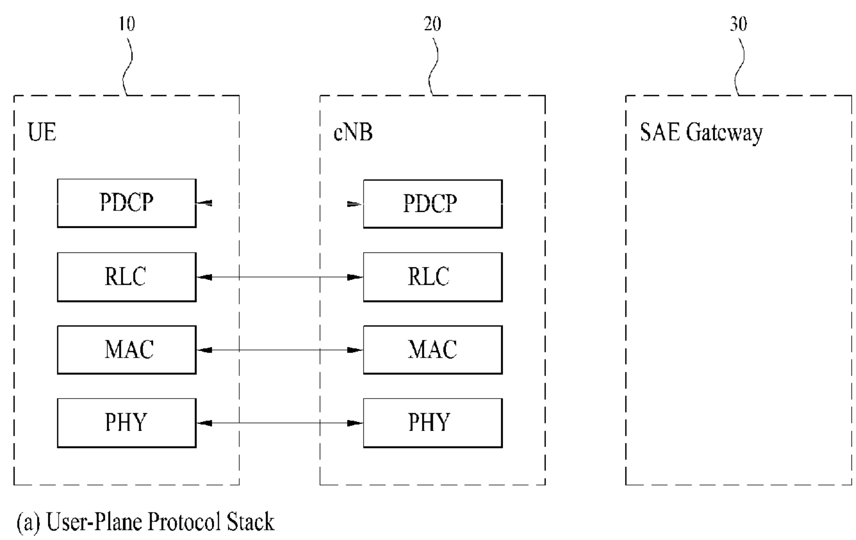
FIG. 2 illustrates a user-plane protocol and a control-plane protocol stack for the E-UMTS.
Figure 2:
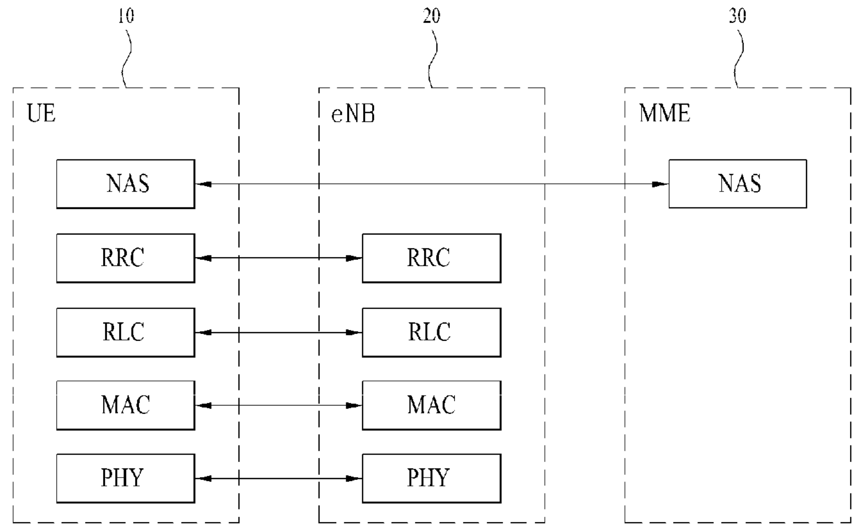

FIG. 2 illustrates a user-plane protocol and a control-plane protocol stack for the E-UMTS. Referring to FIG. 2, the protocol layers may be categorized as a first layer (L1), a second layer (L2), and a third layer (L3), based upon the three (3) lower layers of an open system interconnection (OSI) standard model, which is disclosed in the technical field of communication systems.

The first layer (L1), which is a physical layer (PHY), uses a physical channel, so as to provide an information transfer service to an upper (or higher) layer. The physical layer is connected to a medium access control (MAC) layer, which is located in a layer higher than the physical layer, through a transport channel, and data are transferred between the medium access control layer and the physical layer via the transport channel. Herein, data are transferred between one physical layer of a transmitting end and the other physical layer of a receiving end via the physical channel.

A MAC layer of the second layer (L2) provides a service to a radio link control (RLC) layer above the MAC layer via a logical channel. The RLC layer of the second layer (L2) supports reliable data transfer. In case the MAC layer performs the function of an RLC layer, the RLC layer may be included as a functional block of the MAC layer. A PDCP (packet data convergence protocol) layer of the second layer (L2) performs a header compression function. Herein, the header compression function is performed to effectively transmit internet protocol (IP) packets such as IPv4 or IPv6 through a radio interface having a relatively narrow bandwidth.

A radio resource control (RRC) layer located on a lowest part of a third layer (L3) is defined in the control plane only. The RRC layer controls a logical channel, a transport channel, and a physical channel in association with configuration, re-configuration and release of radio bearers (RBs). Herein, RB refers to a service provided by the second layer (L2) for a data transfer between the user equipment (10) and the E-UTRAN.

Figure 3:
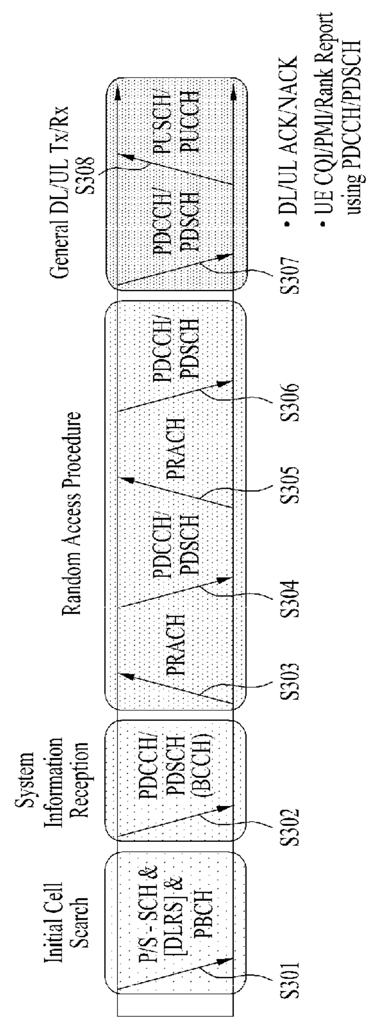
FIG. 3 illustrates a physical channel of an LTE system and an exemplary signal transmission using the physical channel.

FIG. 3 illustrates a physical channel of an LTE system and an exemplary signal transmission using the physical channel.

The user equipment performs initial cell search such as synchronization with the base station, when it newly enters a cell or when the power is turned on (S301). In order to do so, the user equipment synchronizes with the base station by receiving a Primary Synchronization Channel (P-SCH) and a Secondary Synchronization Channel (S-SCH) from the base station, and then acquires information such as Cell Identity (ID), and so on. Thereafter, the user equipment may acquire broadcast information within the cell by receiving a Physical Broadcast Channel from the base station.

Once the user equipment has completed the initial cell search, the corresponding user equipment may acquire more detailed system information by receiving a Physical Downlink Control Channel (PDCCH) and a Physical Downlink Control Channel (PDSCH) based upon the respective information carried in the PDCCH (S302).

Meanwhile, if the user equipment initially accesses the base station, or if there are no radio resources for signal transmission, the user equipment may perform a Random Access Procedure (RACH) with respect to the base station (S303 to S306). In order to do so, the user equipment may transmit a specific sequence to a preamble through a Physical Random Access Channel (PRACH) (S303 and S305), and may receive a response message respective to the preamble through the PDCCH and the PDSCH corresponding to the PDCCH (S304 and S306). In case of a contention based RACH, a Contention Resolution Procedure may be additionally performed.

After performing the above-described process steps, the user equipment may perform PDCCH/PDSCH reception (S307) and Physical Uplink Shared Channel (PUSCH)/Physical Uplink Control Channel (PUCCH) transmission (S308), as general uplink/downlink signal transmission procedures. The control information, which is transmitted by the user equipment to the base station or received by the user equipment from the base station via uplink, includes downlink/uplink ACK/NACK signals, a CQI (Channel Quality Indicator), an SR (Scheduling Request), a PMI (Precoding Matrix Index), an RI (Rank Indicator), and so on. In case of the 3GPP LTE system, the user equipment may transmit control information, such as the above-described CQI/PMI/RI through the PUSCH and/or the PUCCH.

Figure 4:
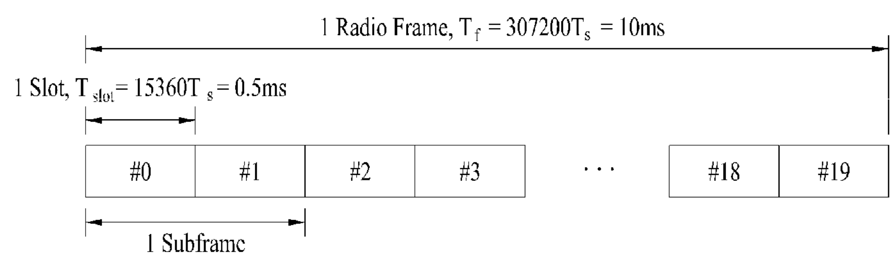
FIG. 4 illustrates an exemplary structure of a radio frame used in an E-UMTS system.

FIG. 4 illustrates an exemplary structure of a radio frame used in an E-UMTS system.

Referring to FIG. 4, an E-UMTS system uses a radio frame of 10 ms, and each radio frame is configured of 10 subframes. Also, a subframe is configured of two consecutive slots. Each slot has the length of 0.5 ms. Furthermore, one slot is configured of multiple symbols (e.g., OFDM symbols, SC-FDMA symbols).

Figure 5:
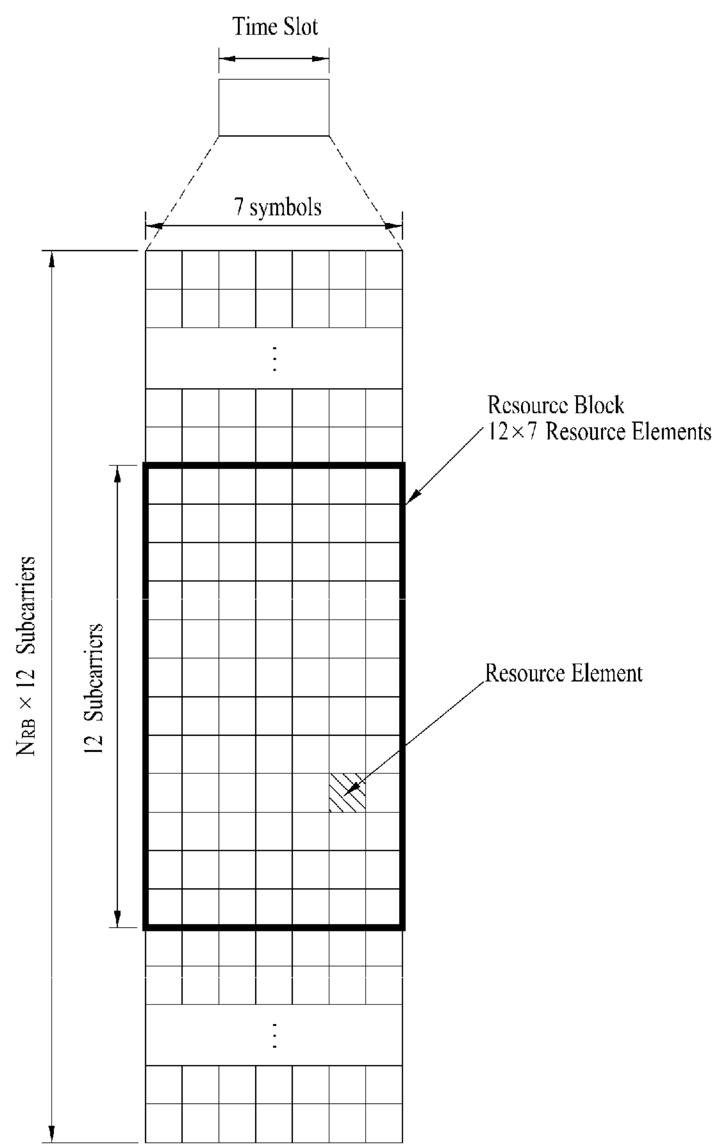
FIG. 5 illustrates an exemplary resource grid respective to a time slot.

FIG. 5 illustrates an exemplary resource grid respective to a time slot.

Referring to FIG. 5, a time slot includes multiple OFDM symbols or SC-FDMA symbols, and the time slot includes multiple Resource Blocks (RBs) in a frequency domain. One resource block includes 12×7(6) resource elements. The number of resource blocks included in a time slot depends upon the frequency bandwidth determined in a cell. Each segment within the resource grid indicates a minimum resource, which is defined by one symbol and one sub-carrier, and is referred to as a Resource Element (RE). Although FIG. 5 shows an example, wherein a time slot includes 7 symbols, and wherein a resource block includes 12 sub-carriers. However, the present invention will not be limited only to the example presented herein. For example, the number of symbols included in the time slot may be varied in accordance with the length of a Cyclic Prefix (CP).

Figure 6:
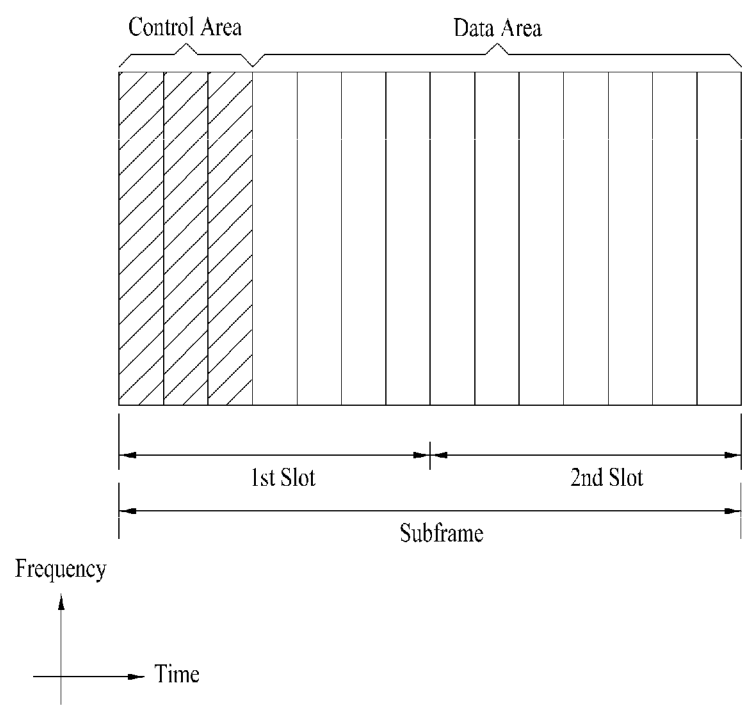
FIG. 6 illustrates an exemplary structure of a downlink subframe.

FIG. 6 illustrates an exemplary structure of a downlink subframe.

Referring to FIG. 6, in an LTE system, a downlink subframe is configured of an L1/L2 control region and a data region being multiplexed by a TDM (Time Division Multiplexing) scheme. The L1/L2 control region consists of the first n (e.g., 3 or 4) number of OFDM symbols of a subframe, and the remaining OFDM symbols are used to configure the data region. The L1/L2 control region includes a PDCCH (Physical Downlink Control Channel) for carrying (or transporting) downlink control information, and the data region includes a PDSCH (Physical Downlink Shared Channel), which corresponds to a downlink data channel. In order to receive a downlink signal, the user equipment reads out downlink scheduling information from the PDCCH. Then, the user equipment uses resource allocation information indicated by the downlink scheduling information to receive the downlink data carried over the PDSCH. The resource (i.e., PDSCH) being scheduled to the user equipment is allocated in resource block units or resource block group units.

The PDCCH notifies information on resource assignment (or allocation) of transmitting channels PCH (Paging CHannel) and DL-SCH (Downlink-Shared CHannel), Uplink Scheduling Grant, HARQ information, and so on, to each user equipment. All information being transmitted through the PDCCH is collectively referred to a Downlink Control Information (DCI). The PDCCH may be configured of different formats depending upon the corresponding information. The DCI may have diverse DCI formats depending upon the contents of the information. For example, DCI format 0, which is associated with uplink scheduling, may be configured as shown in Table 1 below.

TABLE 1

| Field | Bits | Comment |
|---|---|---|
| Format | 1 | Uplink grant or downlink assignment |
| Hopping flag | 1 | Frequency hopping on/off |
| RB assignment | 7 | — |
| MCS | 5 | — |
| DMRS | 3 | Cyclic shift of demodulation reference signal |
| . | . | . |
| . | . | . |
| . | . | . |
| RNTI/CRC | 16 | 16 bit RNTI implicitly encoded in CRC |
| Total | 38 | — |

MCS: Modulation an Coding Scheme
RNTI: Radio Network Temporary Identifier
CRC: Cyclic Redundancy Check Information as to which user equipment the PDCCH is to be transmitted may be identified by using the RNTI. For example, it will be assumed that the PDCCH is CRC-masked by using an RNTI A, and that the PDCCH transmits uplink radio resource allocation information (e.g., frequency location) B, and that the PDCCH also transmits transmission format information (e.g., transmission block size, modulation scheme, coding information, etc.). In this case, the user equipment included in a cell uses its own RNTI to monitor the PDCCH, and the user equipment having RNTI A performs uplink transmission in accordance with information B and C, which are acquired from the PDCCH.

Figure 7:
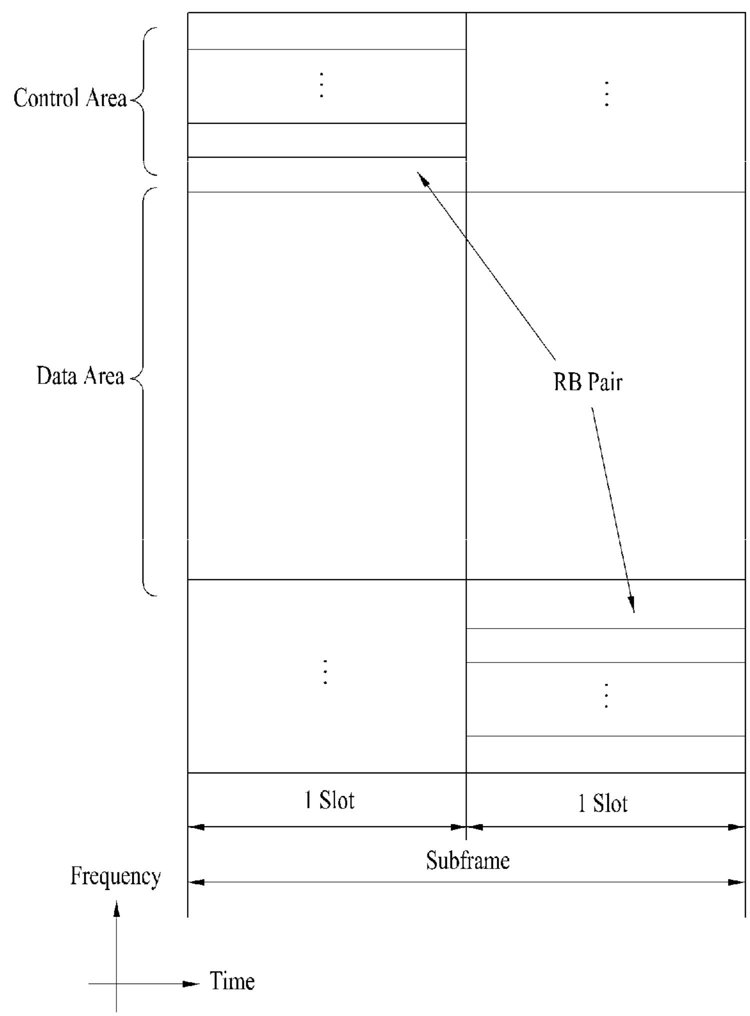
FIG. 7 illustrates an exemplary structure of an uplink subframe, which is used in the LTE.

FIG. 7 illustrates an exemplary structure of an uplink subframe, which is used in the LTE.

Referring to FIG. 7, an uplink subframe includes multiple (e.g., two (2)) slots. Herein, each slot may include a different number of SC-FDMA symbols depending upon the CP length. For example, in case of a normal CP, a slot may include 7 SC-FDMA symbols. An uplink subframe may be divided into a data region and a control region. Herein, the data region includes a PUSCH and is used for transmitting data signals, such as voice (or audio), and so on. The control region includes a PUCCH and is used for transmitting control information. The PUCCH includes an RB pair located at each end portion of the data region along a frequency axis, and the PUCCH hops at a slot boundary. The control information includes an SR (Scheduling Request) for requesting an uplink transmission resource, an HARQ ACK/NACK (Hybrid Automatic Repeat and request Acknowledgement/Negative ACK) for downlink data.

Figure 8:
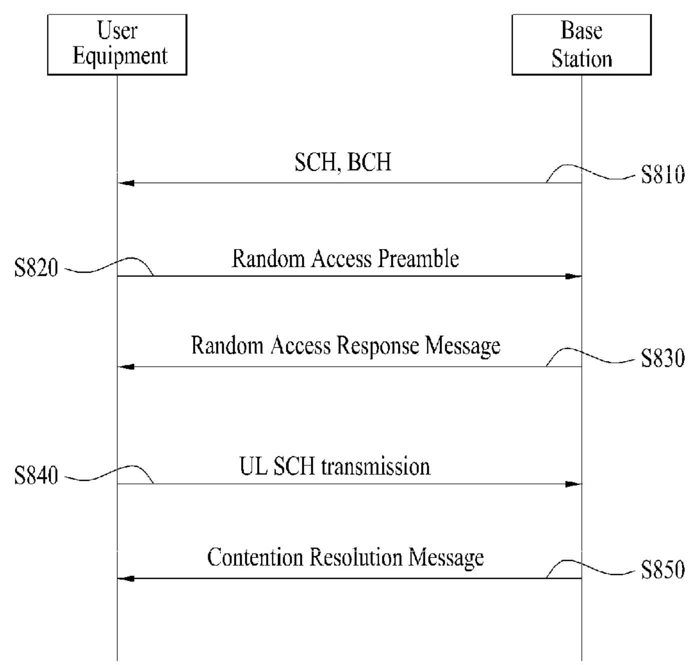
FIG. 8 and FIG. 9 illustrate process steps an RACH (Random Access Channel) procedure.
Figure 9:
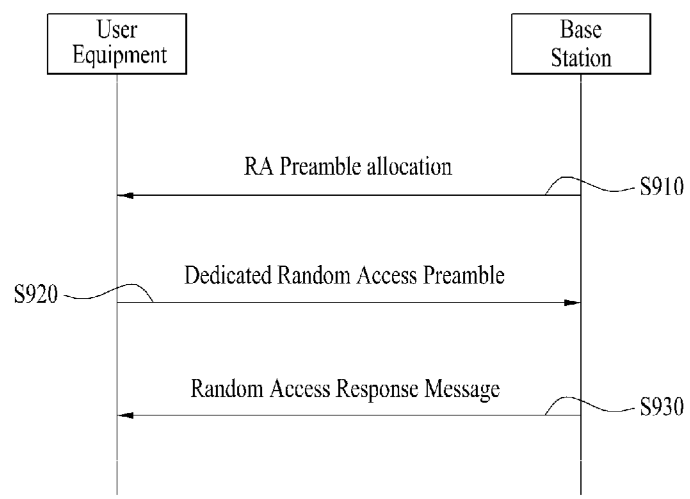

FIG. 8 and FIG. 9 illustrate process steps an RACH (Random Access Channel) procedure. FIG. 8 illustrates a contention based RACH procedure, and FIG. 9 illustrates a non-contention based RACH procedure.

Referring to FIG. 8, in case of performing an initial access to the network, the user equipment acquires (or receives) a downlink synchronization through a downlink synchronization channel, and the user equipment receives system information (SI-x information) through a P-BCH (Physical-Broadcast CHannel) and a D-BCH (Dynamic-Broadcast CHannel). Thus, the user equipment may acquire a system required parameter and a RACH parameter (S810). Thereafter, the user equipment generates a Random Access Preamble (also referred to as Message 1) from a randomly selected preamble sequence and, then, transmits the generated Random Access Preamble to the base station through a PRACH (Physical Random Access Channel) (S820). When the base station detects a Random Access Preamble from the user equipment, the base station transmits a Random Access Response (also referred to as Message 2) to the user equipment (S830). More specifically, downlink information respective to the Random Access Response message is CRC-masked by using an RA-RNTI (Random Access-RNTI). Accordingly, the Random Access Response message may be transmitted over an L1/L2 control channel (PDSCH). After receiving the downlink scheduling signal, which is masked by using the RA-RNTI, the user equipment may receive Random Access Response message from the PDSCH and may, then, decode the received Random Access Response message. The Random Access Response information may include a Timing Advance (TA), which indicates timing offset information for synchronization, radio resource allocation information being used in an uplink, a temporary identifier (e.g., Temporary Cell-RNTI: TC-RNTI) for user equipment identification. When the user equipment receives the random access response information, an uplink message (also referred to as Message 3) may be transmitted to an uplink SCH (UL Shared Channel) in accordance with radio resource allocation information, which is included in the response information (S840). After receiving Message 3 from the user equipment, the base station transmits a convention resolution (also referred to as Message 4) message to the user equipment (S850).

Referring to FIG. 9, the user equipment is allocated with an RACH preamble from the base station via dedicated signaling (S910). Unlike the contention based RACH procedure, the user equipment is allocated with a dedicated preamble sequence (signature), which is to be used in the RACH procedure, from the base station. Thereafter, the user equipment generates a random access preamble from the dedicated preamble sequence allocated by the base station and, then, transmits the generated random access preamble to the base station through a PRACH (S920). When the base station detects the random access preamble, the base station transmits a random access response message to the user equipment (S930). Thereafter, the RACH procedure is ended.

Figure 10:
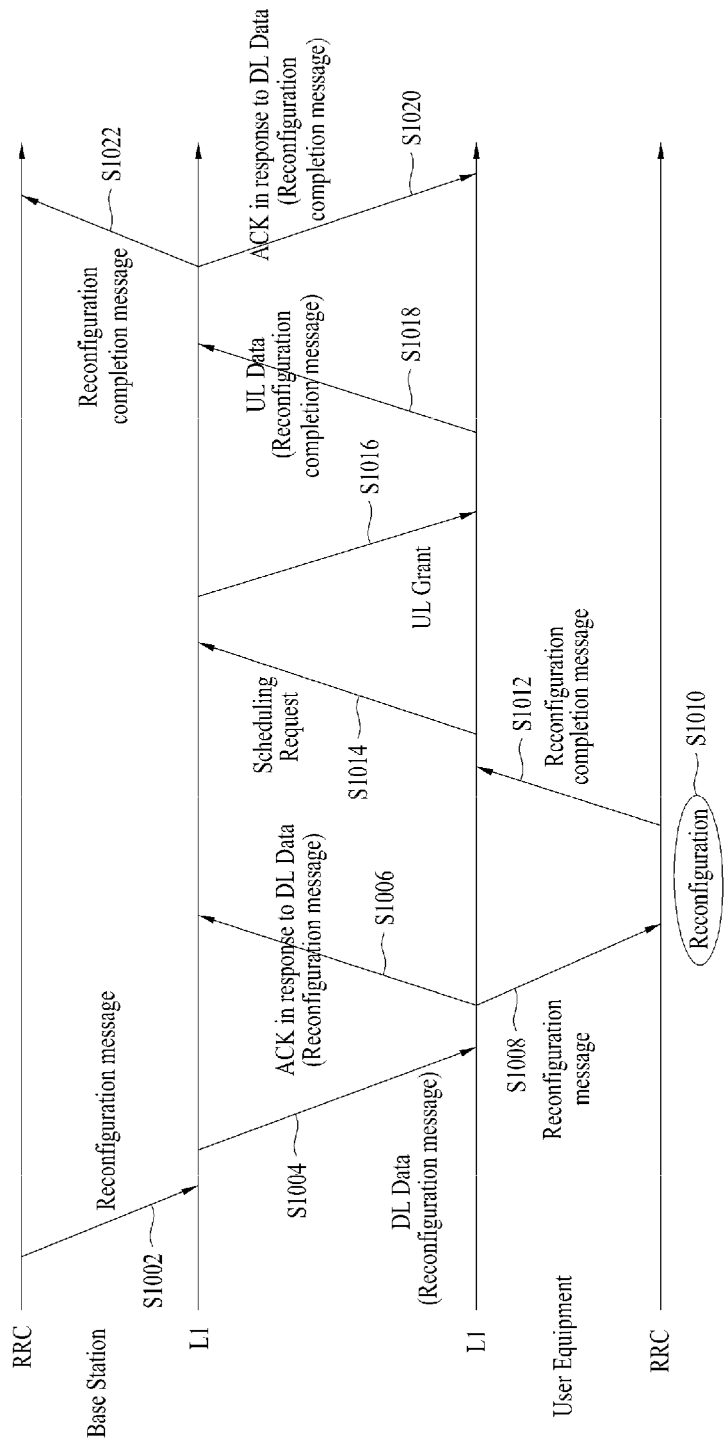
FIG. 10 illustrates an exemplary RRC reconfiguration procedure in an LTE.

FIG. 10 illustrates an exemplary RRC reconfiguration procedure in an LTE.

Referring to FIG. 10, an RRC layer of the base station delivers an RRC reconfiguration message to the physical layer (L1) of the base station (S1002). The base station transmits DL data including the RRC reconfiguration message to the user equipment (S1004). The physical layer (L1) of the user equipment transmits an ACK respective to the DL data including the RRC reconfiguration message to the base station (S1006), and transmits the RCC reconfiguration message to the RRC layer (S1008). The RRC layer of the user equipment performs RRC reconfiguration (S1010). Thereafter, the RRC reconfiguration complete message is transmitted to the physical layer (L1) of the user equipment (S1012). In order to acquire an uplink transmission resource for transmitting the RRC reconfiguration complete message, the user equipment transmits an SR (Scheduling Request) to the base station. When the user equipment receives a UL grant, which includes allocation information related to the uplink transmission resource, from the base station (S1015), the user equipment uses the allocated transmission resource so as to transmit the RRC reconfiguration complete message to the base station (S1018). The physical layer (L1) of the base station transmits an ACK respective to the UL data to the user equipment (S1020). Subsequently, the physical layer (L1) of the base station delivers the RRC reconfiguration complete message to the RRC layer of the base station (S1022).

Figure 11:
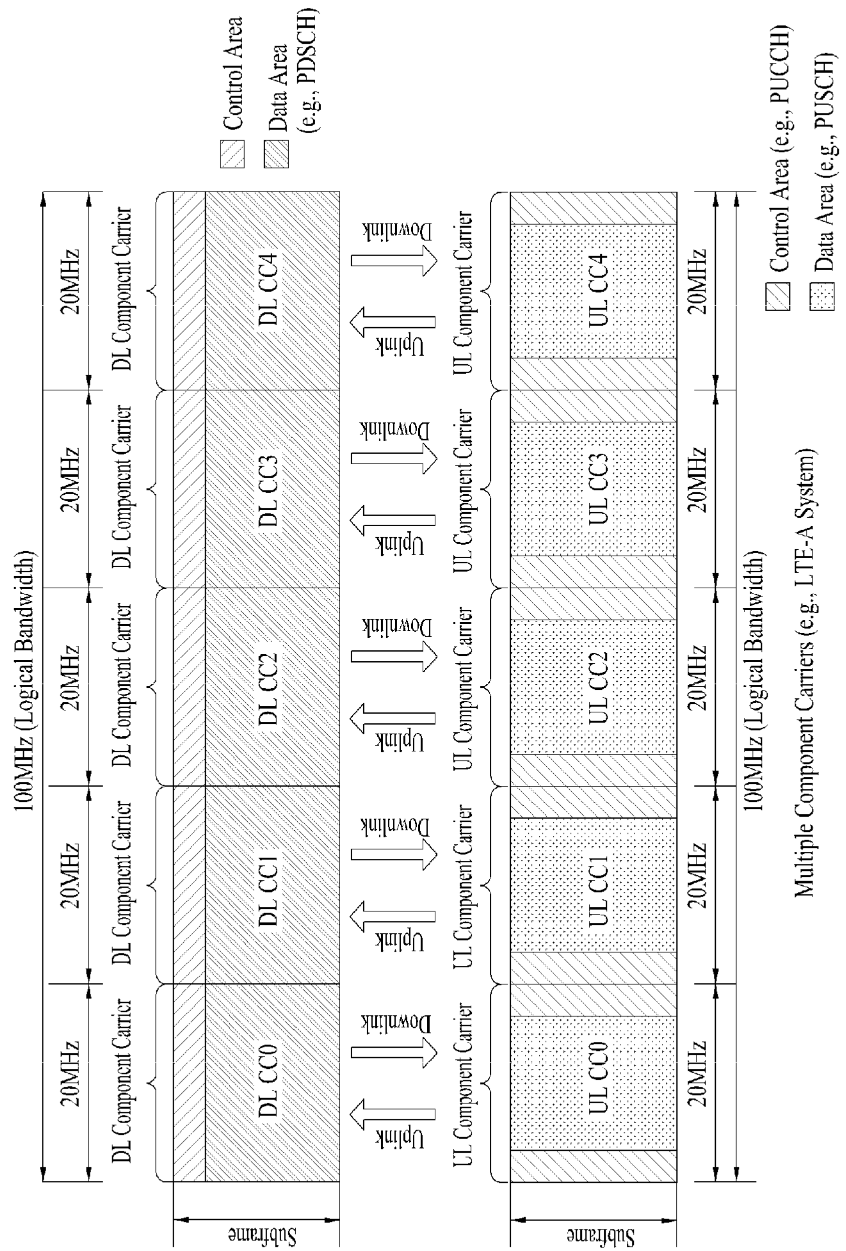
FIG. 11 illustrates an example of performing communication under a carrier aggregation condition.

FIG. 11 illustrates an example of performing communication under a carrier aggregation condition. FIG. 11 may correspond to a communication example of an LTE-A (Advanced) system. In order to use a wider frequency bandwidth, the LTE-A system adopts a carrier aggregation (or bandwidth aggregation) technology gathering a plurality of up-/downlink frequency blocks, so as to use a larger (or wider) up-/downlink bandwidth. Each frequency block is transmitted by using a Component Carrier (CC). In the description of the present invention, depending upon the context, the component carrier (CC) may signify a frequency block for carrier aggregation or a central carrier of the frequency block, and such definitions may be alternately used herein.

Referring to FIG. 11, 5 (five) 20 MHz CCs may be gathered in each of the up-/downlink, so as to support a 100 MHz bandwidth. The CCs may be adjacent or non-adjacent to one another in the frequency domain. The radio frame structure shown in FIG. 5 may be identically applied to a case where multiple component carriers are being used. FIG. 11 shows an example where the bandwidth of the UL CC and the bandwidth of the DL CC are identical to one another and are symmetrical to one another. However, the bandwidth of each CC may be decided independently. For example, the bandwidth of the UL CC may be configured as 5 MHz (UL CC0)+20 MHz (UL CC1)+20 MHz (UL CC2)+20 MHz (UL CC3)+5 MHz (UL CC4). Also, an asymmetrical carrier aggregation (or bandwidth aggregation), wherein the number of UL CCs and the number of DL CCs are different from one another, may be used. The asymmetrical carrier aggregation (or bandwidth aggregation) may be generated due to a limitation in the available frequency band, or may be artificially configured by network settings. Also, although it is shown, as an example, that the uplink signal and the downlink signal are transmitted through a CC mapped at a one-to-one (1:1) correspondence with the signal, the CC through which a signal is actually being transmitted may vary depending upon the network settings or the signal type. For example, a CC transmitting a scheduling command and a CC transmitting data in accordance with a scheduling command may be different from one another. Furthermore, up-/downlink control information may be transmitted through specific UL/DL CC, regardless of the mapping state between the CCs.

Meanwhile, even if the overall system band is configured of N number of CCs, the frequency band that can be received by one specific terminal may be limited to M(<N) number of CCs. Various parameters respective to the carrier aggregation may be determined by using a cell-specific method, a UE group-specific method, or a UE-specific method. Therefore, when N number of CCs exists within a cell, the user equipment may perform communication with the base station by using all of the N number of DL/UL CCs. However, by using a semi-static method, the base station may also limit the number of DL/UL CCs that can be used by the user equipment to M(M<N). Additionally, even after being configured, the DL/UL CC(s) that can be used by the user equipment may be changed (or reconfigured) due to any random reason (e.g., QoS (Quality of Service), traffic demand, CC load, etc.). More specifically, the DL/UL CC(s) that can be used by the user equipment may be changed (or reconfigured), and CC related information should be reconfigured for the CC change (i.e., CC reconfiguration). In order to do so, RRC (or Radio Bearer (RB)) reconfiguration may be performed. In the description of the present invention, CC-related information reconfiguration, radio bearer reconfiguration, and RRC reconfiguration merely correspond to examples given to describe a change in or reconfiguration of parameters of the user equipment/base station in accordance with the CC reconfiguration. Therefore, the present invention will not be limited only to the examples presented herein. For simplicity, CC-related information reconfiguration, radio bearer reconfiguration, and RRC reconfiguration will be collectively referred to as RRC reconfiguration.

Meanwhile, the RRC reconfiguration for the CC reconfiguration may be considered to be performed by using a method similar to that of the RRC reconfiguration procedure (FIG. 10), which is defined in the conventional LTE system. However, in case of the conventional LTE RRC reconfiguration, only the RRC parameter is reconfigured (e.g., change in the transmission mode, etc.) while the carrier wave remains unchanged, as shown in FIG. 10. Also, as described in step S1016 and step S1018 of FIG. 10, for example, when seeking to ensure a UL grant dedicated for transmitting an RRC reconfiguration complete message, the following problems may be considered.

First of all, Scheduling Request (SR) resource and information that are to be used in a target UL CC should be allocated in advance.

Secondly, even if the problem related to the SR resource and information is resolved, at a point where the synchronization of the target UL CC is not completed, the SR transmission of the user equipment is unreliable. Since the SR resource is a resource shared by multiple user equipments, the timing and cycle period of the SR transmission should be accurately synchronized, and the SR resource cannot be transmitted only to a specific user equipment.

Thirdly, even if the SR transmission is successfully performed, it will be unreasonable for the base station to transmit a PDCCH (UL grant) to the target DL CC in a state where the synchronization between the base station and the corresponding user equipment remains unknown.

Hereinafter, a method for efficiently performing CC reconfiguration (i.e., changing CC related information for a CC change, RRC reconfiguration, or radio bearer reconfiguration) in a carrier aggregation situation and, more limitedly, within the same cell and an apparatus for the same will be described in detail with reference to the appended drawings and the exemplary embodiments of the present invention.

Figure 12:
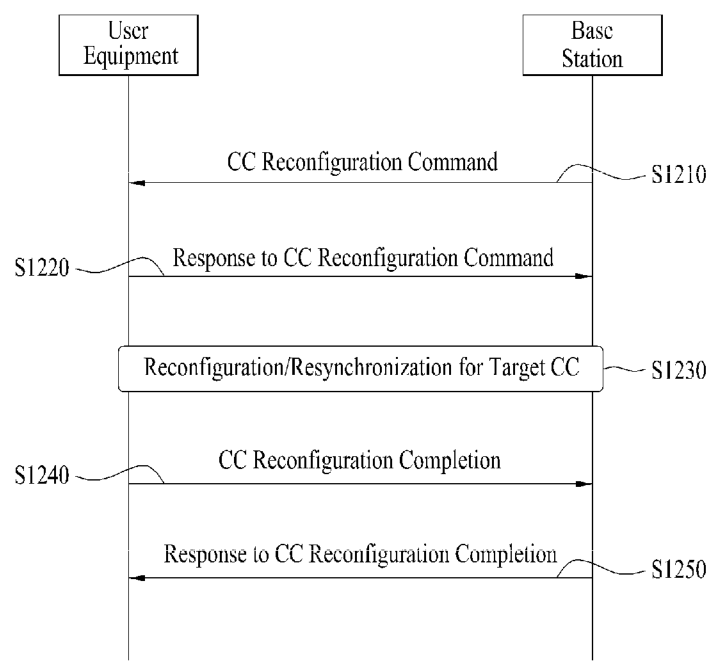
FIG. 12 illustrates a flow chart showing the process steps for performing a Component Carrier (CC) reconfiguration procedure according to an exemplary embodiment of the present invention.

FIG. 12 illustrates a flow chart showing the process steps for performing a Component Carrier (CC) reconfiguration procedure according to an exemplary embodiment of the present invention. FIGS. 13~18 respectively a CC reconfiguration procedure according to an exemplary embodiment of the present invention.

Referring to FIG. 12, when the base station wishes to change the configurations of the DL/UL CC(s) (i.e., CC reconfiguration) of the user equipment, the base station transmits a CC reconfiguration command to the user equipment through source DL CC(s) (S1210). More specifically, CC reconfiguration includes all procedures of adding a new CC, removing a portion of the CCs from the initially configured CCs, and changing at least a portion of the initially configured CCs to other CCs. Herein, CC reconfiguration may be performed in DL CC units, UL CC units, or DL/UL CC pair units. For simplicity, a CC that the user equipment seeks to access after the CC reconfiguration procedure will be referred to as a target CC or a new CC. And, a CC to which the user equipment is already connected (or a CC that the user equipment is already accessing) will be referred to as a source CC, a serving CC, or an old CC. Herein, in case multiple source DL CCs exist, the CC reconfiguration command may be repeatedly transmitted through each of the source DL CCs, or the CC reconfiguration command may be transmitted through a specific DL CC (e.g., primary or anchor DL CC).

The CC reconfiguration command may be transmitted through a PDCCH, or through a PDSCH, which is scheduled by the PDCCH. The CC reconfiguration command may be an RRC message and may include information related to the target CC, and resource information for transmitting the CC reconfiguration complete signal of step S1240. The information related to the target CC may, for example, include information related to a CC index (e.g., CC index, difference (or offset) between the corresponding CC index and a serving CC index), part of the system information, antenna configuration information used for the target CC, and so on. The resource information for transmitting the CC reconfiguration complete signal includes information for generating a random access preamble. More specifically, the resource information for transmitting the CC reconfiguration complete signal includes at least one of a route sequence index for a preamble signature, a cyclic shift parameter, and a signature index for a dedicated preamble, and, preferably, the resource information for transmitting the CC reconfiguration complete signal includes a signature index for a dedicated preamble.

When the user equipment has received the CC reconfiguration command, the user equipment transmits a response to the CC reconfiguration command (e.g., ACK/NACK signal) to the base station through the source UL CC(s) (S1220). Herein, when multiple source UL CCs exist, the CC reconfiguration command may be repeatedly transmitted through each of the source UL CCs, or the CC reconfiguration command may be transmitted through a specific UL CC (e.g., primary or anchor UL CC). The response of step S1220 may be transmitted through the PUCCH or the PUCCH. In some cases, step S1220 may be omitted.

After receiving the CC reconfiguration command, or after transmitting a response to step S1230, reconfiguration/resynchronization for the target DL CC is performed (S1230). The reconfiguration for the target DL CC includes the reconfiguration for the CC related information in accordance with a change in the CC, the radio bearer reconfiguration, and/or the RRC reconfiguration. And, the resynchronization for the target DL CC includes the acquisition of a downlink synchronization through a synchronization signal (e.g., SCH). The reconfiguration/resynchronization for the target DL CC may be performed during a predetermined number of subframes in order to ensure user equipment operation (e.g., control of a local oscillator, tracking frequency offsets, etc.), and the required number of numbers may be defined in advance by the user equipment and the base station or may be shared in advanced via signaling.

Subsequently, the user equipment transmits a signal indicating CC reconfiguration completion (or reconfiguration completion of the CC related information) to the base station (S1240). The signal for indicating the CC reconfiguration completion may be transmitted through source UL CC(s), target UL CC(s), or by both source UL CC(s) and target UL CC(s) depending upon the CC reconfiguration situation (or scenario). Also, when multiple source UL CCs and target UL CCs exist, the CC reconfiguration complete signal may be repeatedly transmitted through all UL CCs, or the CC reconfiguration complete signal may be transmitted through a specific source UL CC (e.g., primary or anchor source UL CC) or may be transmitted through a specific target UL CC (e.g., primary or anchor target UL CC). The CC reconfiguration complete signal is not particularly limited. However, preferably, the CC reconfiguration complete signal includes a dedicated RACH preamble. The user equipment has the following advantages, when using the dedicated RACH preamble in comparison with the related art RRC reconfiguration procedure (FIG. 10) using the SR. First of all, latency and power consumption accompanying the CC reconfiguration procedure (most particularly, a completion message report) may be reduced. Secondly, by reusing the conventional dedicated RACH preamble allocation method, an overhead accompanying the completion message report may also be reduced. Nevertheless, the RRC reconfiguration procedure using the SR will not be excluded from the present invention. And, depending upon the circumstances, the RRC reconfiguration procedure using the SR may be efficiently used. In the description of the present invention, an example of performing the RRC reconfiguration procedure using the SR will be described in more detail later on with reference to the accompanying drawings.

After receiving the dedicated RACH preamble, the base station transmits a response signal respective to the received dedicated RACH preamble to the user equipment (S1250). Accordingly, the CC reconfiguration (and the respective RRC reconfiguration) between the base station and the corresponding user equipment is completed. The response signal respective to step S1250 represents a response to the indication made by the user equipment with respect to the target DL CC (i.e., CC reconfiguration complete). Although the response signal of this process step (S1250) is not particularly limited, it is preferable that the response signal includes a PDCCH transmission. In this case, the PDCCH may carry PDSCH allocation/PUSCH grant respective to the target DL/UL CC (normal PUCCH), or the PDCCH may not carry any data scheduling (pure PDCCH). In order to indicate that the PDCCH corresponds to a response to the dedicated RA-preamble (i.e., CC reconfiguration completion), the entire PDCCH or a portion of the PDCCH may be masked or scrambled with a specific value. For example, the CRC of the PDCCH may be masked or scrambled by using the RA-RNTI. Also, the PDCCH may directly include identification information indicating that the PDCCH corresponds to a response respective to the CC reconfiguration completion. Furthermore, the identification information indicating that the PDCCH corresponds to a response respective to the CC reconfiguration completion may also be included in the PDSCH, which is scheduled by the PDCCH, (e.g., random access response).

Figure 13:
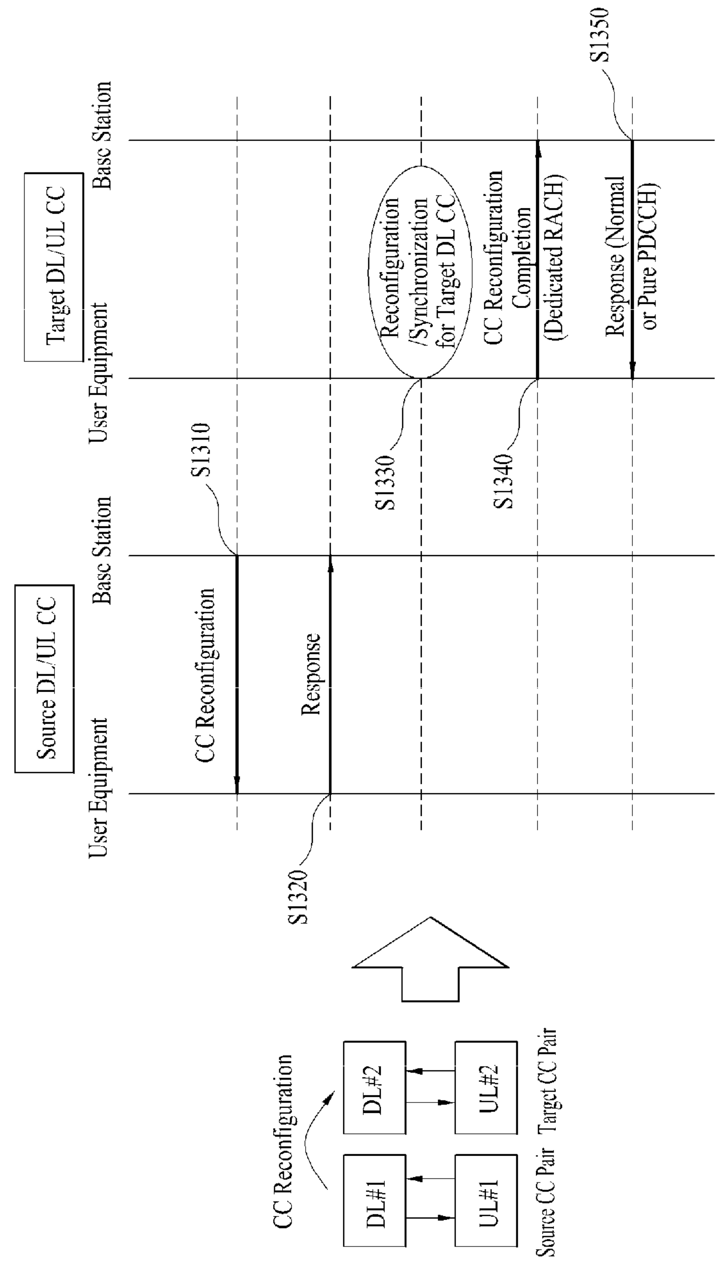
FIGS. 13~19 illustrate exemplary methods for performing CC reconfiguration according to an exemplary embodiment of the present invention.

FIG. 13 illustrates an exemplary method for performing CC reconfiguration according to an exemplary embodiment of the present invention. Although FIG. 13 illustrates a single CC configurable UE, in order to facilitate the understanding of the present invention, the present invention will not be limited only to the example given herein.

Referring to FIG. 13, the base station transmits a CC reconfiguration command to the user equipment through a source DL CC (DL #1) (S1310). The user equipment transmits a response signal respective to the CC reconfiguration command through a source UL CC (UL #1) (S1320). Herein, step S1320 may be omitted. Thereafter, the user equipment performs reconfiguration/resynchronization on a target DL CC (DL #2) (S1330). Then, in order to indicate a response to the CC reconfiguration completion, the user equipment transmits a dedicated RACH preamble to the base station through a target UL CC (UL #2) (S1340). Afterwards, the base station transmits a signal indicating the response to the CC reconfiguration completion to the user equipment through the target DL CC (DL #2) (S1350). More specifically, the base station transmits a PDCCH as a response to the CC reconfiguration completion. In this case, the PDCCH may carry PDSCH/PUSCH scheduling information (normal PUCCH), or the PDCCH may not carry any scheduling information (pure PDCCH).

Figure 14:
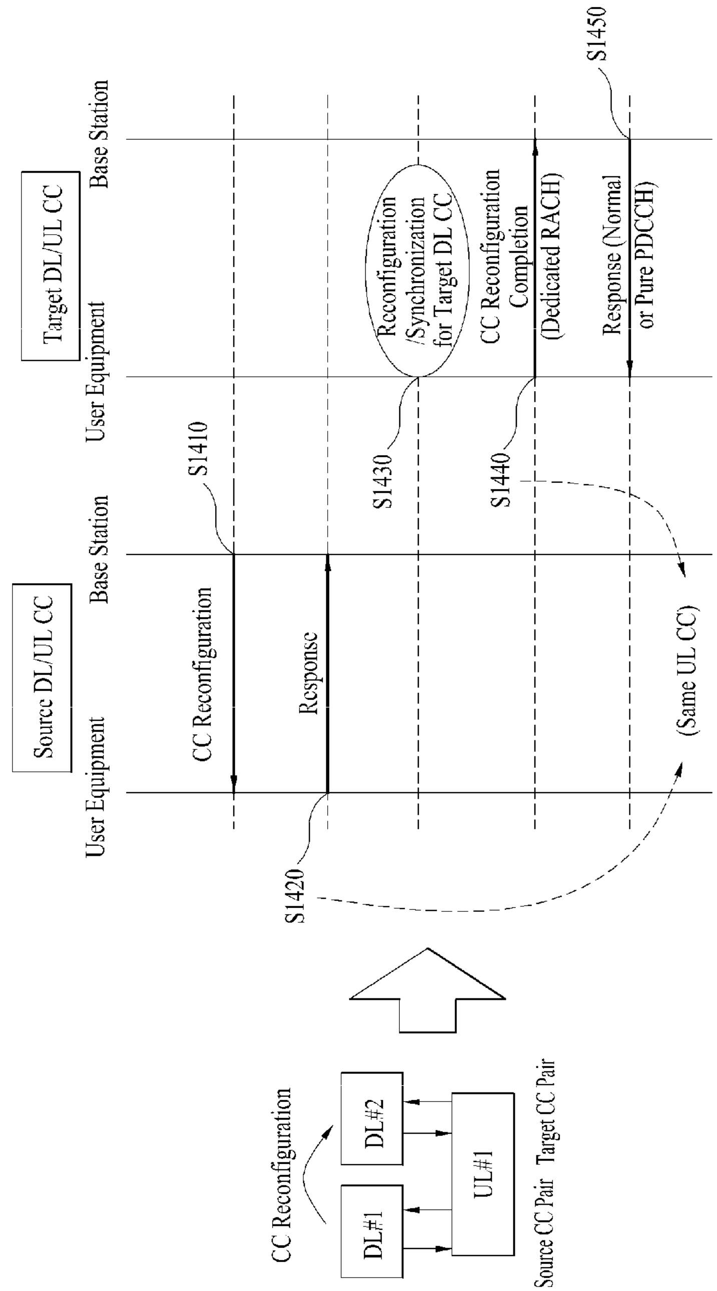

FIG. 14 illustrates another exemplary method for performing CC reconfiguration according to an exemplary embodiment of the present invention. This exemplary embodiment of the present invention shows an example of an asymmetrical carrier aggregation situation, wherein multiple DL CCs may be linked to a single UL CC. The basic CC reconfiguration procedure is the same as those shown in FIG. 12 and FIG. 13. However, in this embodiment, the UL CC is not changed in the CC reconfiguration procedure. That is, the source UL CC is the same as the target UL CC. Therefore, the response to the CC reconfiguration command and the CC reconfiguration completion are transmitted through the same UL CC. Meanwhile, this embodiment of the present invention may also be similarly applied in a case where multiple UL CCs are linked to a single DL CC.

Referring to FIG. 14, the base station transmits a CC reconfiguration command to the user equipment through a source DL CC (DL #1) (S1410). The user equipment transmits a response signal respective to the CC reconfiguration command through a source UL CC (UL #1) (S1420). Herein, step S1420 may be omitted. Thereafter, the user equipment performs reconfiguration/resynchronization on a target DL CC (DL #2) (S1430). Then, in order to indicate a response to the CC reconfiguration completion, the user equipment transmits a dedicated RACH preamble to the base station through a target UL CC (UL #1) (S1440). As shown in FIG. 14, the response to the CC reconfiguration command (S1420) and the CC reconfiguration completion (S1440) are transmitted through the same UL CC. Afterwards, the base station transmits a signal indicating the response to the CC reconfiguration completion (e.g., PDCCH) to the user equipment through the target DL CC (DL #2) (S1450). The PDCCH may carry PDSCH/PUSCH scheduling information (normal PUCCH), or the PDCCH may not carry any scheduling information (pure PDCCH).

Figure 15:
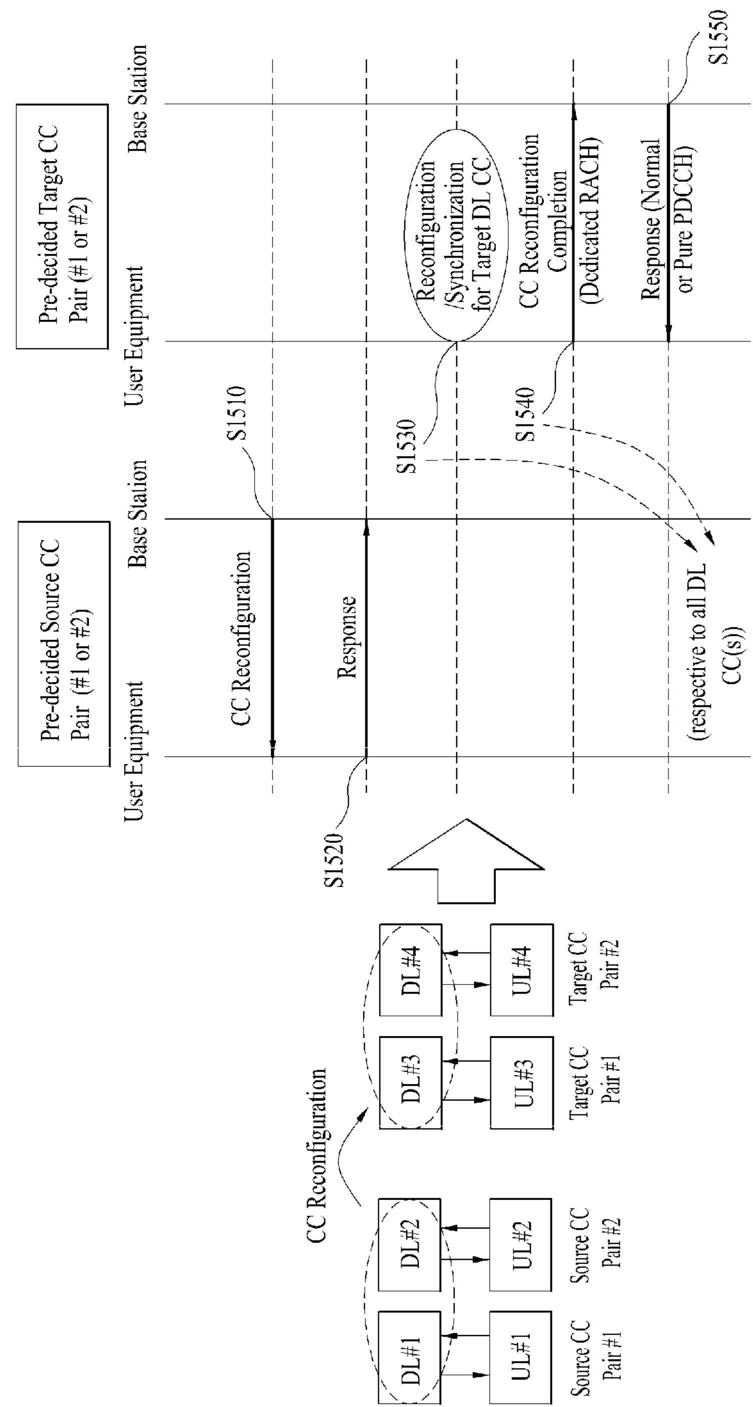

FIG. 15 illustrates yet another exemplary method for performing CC reconfiguration according to an exemplary embodiment of the present invention. This embodiment of the present invention shows an example of a multiple CC configurable UE (i.e., a UE capable of configuring M(>1) number of DL/UL CC pairs). In this case, the proposed method as described above may be varied and applied. For simplicity, the number of reconfigured CCs (e.g., number of CC pairs) will be referred to as K. This exemplary embodiment of the present invention shows a case when the number (M) of DL/UL CC pairs, which can be configured by the user equipment, is identical to the number (K) of reconfigured DL/UL CC pairs. When M=K, among all CC pairs, a source CC pair and a target CC pair, through which DL/UL control signaling is performed for CC reconfiguration, are pre-decided by the base station and may be delivered in advance to the user equipment through the CC reconfiguration command. In this case, it may be proposed to consider all target CCs during the reconfiguration/resynchronization step and during the CC reconfiguration completion transmission step.

Referring to FIG. 15, the base station transmits a CC reconfiguration command to the user equipment through source DL CC(s) (DL #1 and/or DL #2) (S1510). The user equipment transmits a response signal respective to the CC reconfiguration command through source UL CC(s) (UL #1 and/or UL #2) (S1520). Herein, step S1520 may be omitted. Thereafter, the user equipment performs reconfiguration/resynchronization on all target DL CCs (DL #2 and DL #3) (S1530). Then, when the reconfiguration is completed for all target CCs, in order to indicate a response to the CC reconfiguration completion, the user equipment transmits a dedicated RACH preamble to the base station through target UL CC(s) (UL #3 and/or UL #4) (S1540). Afterwards, the base station transmits a signal indicating the response to the CC reconfiguration completion (e.g., PDCCH) to the user equipment through the target DL CC(s) (DL #3 and/or DL #4) (S1550). The PDCCH may carry PDSCH/PUSCH scheduling information (normal PUCCH), or the PDCCH may not carry any scheduling information (pure PDCCH).

Figure 16:
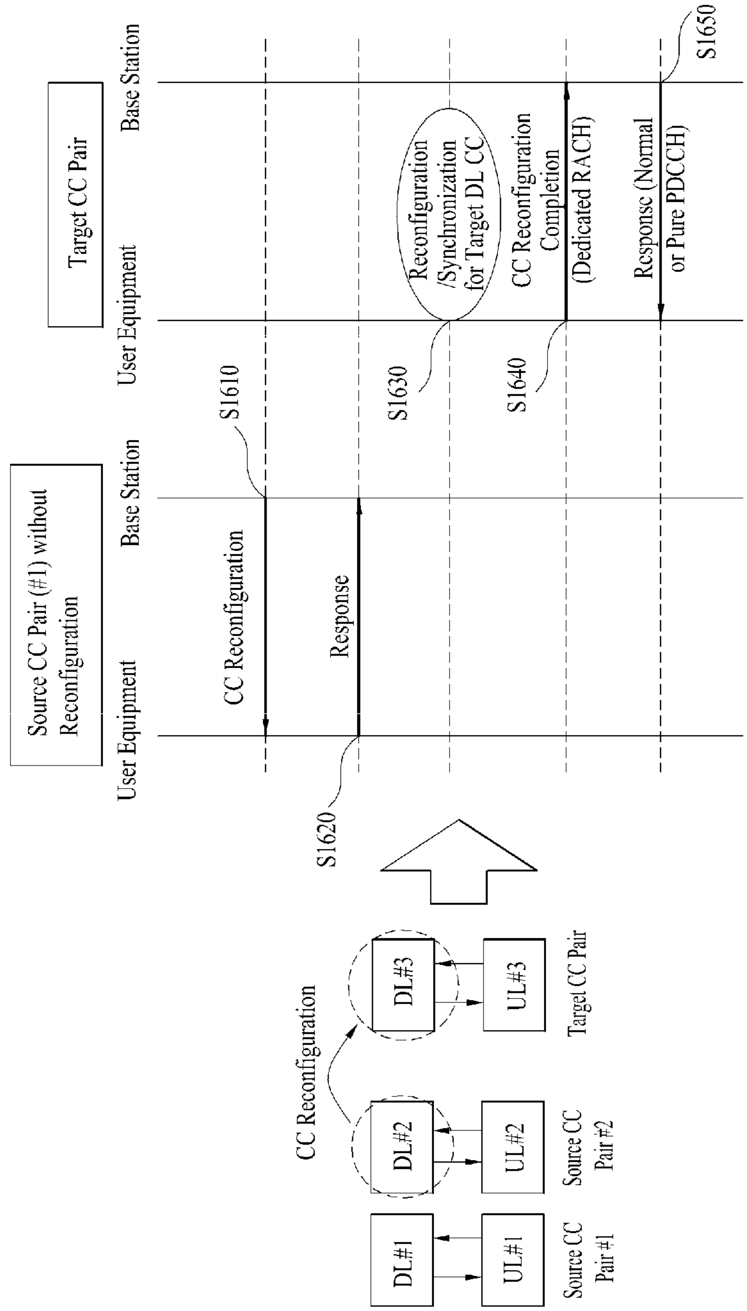
Figure 17:
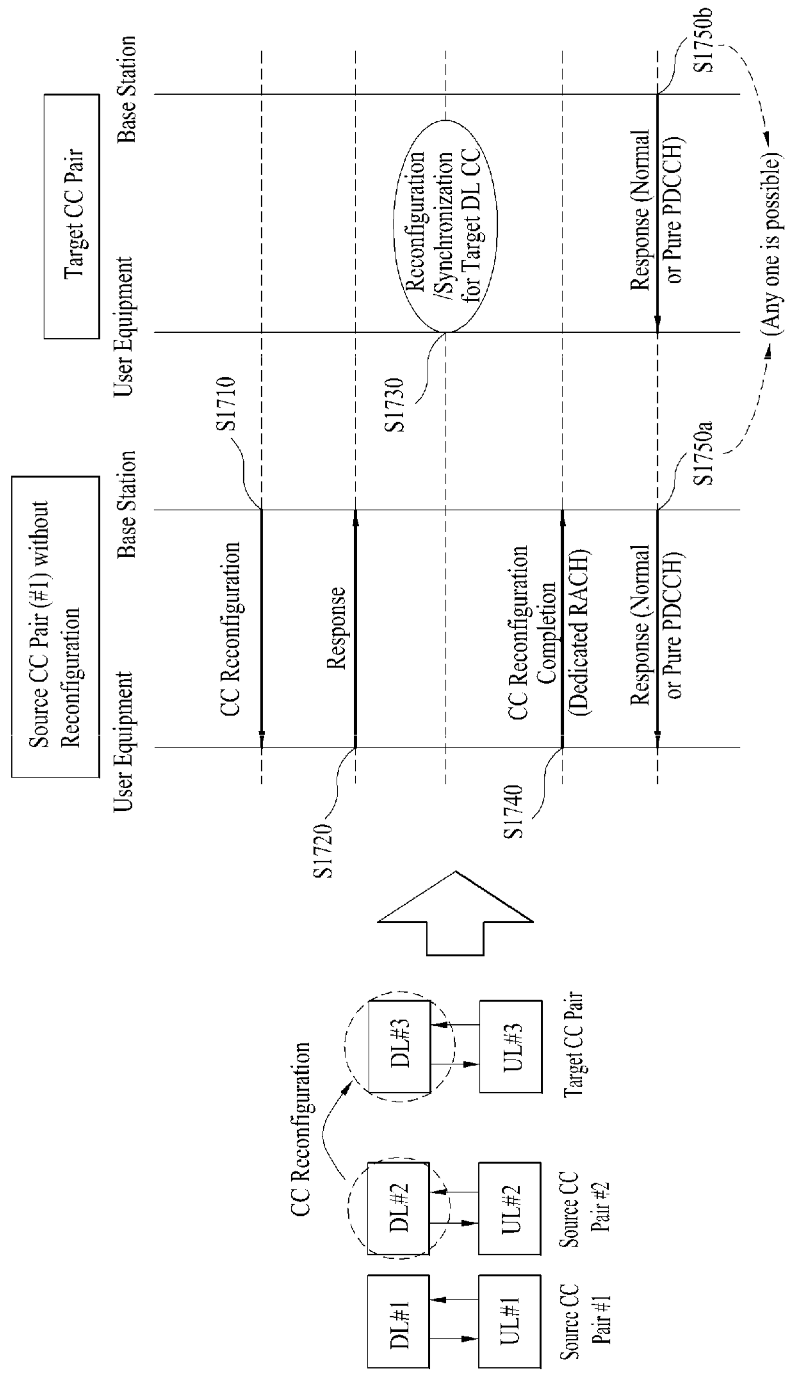
Figure 18:
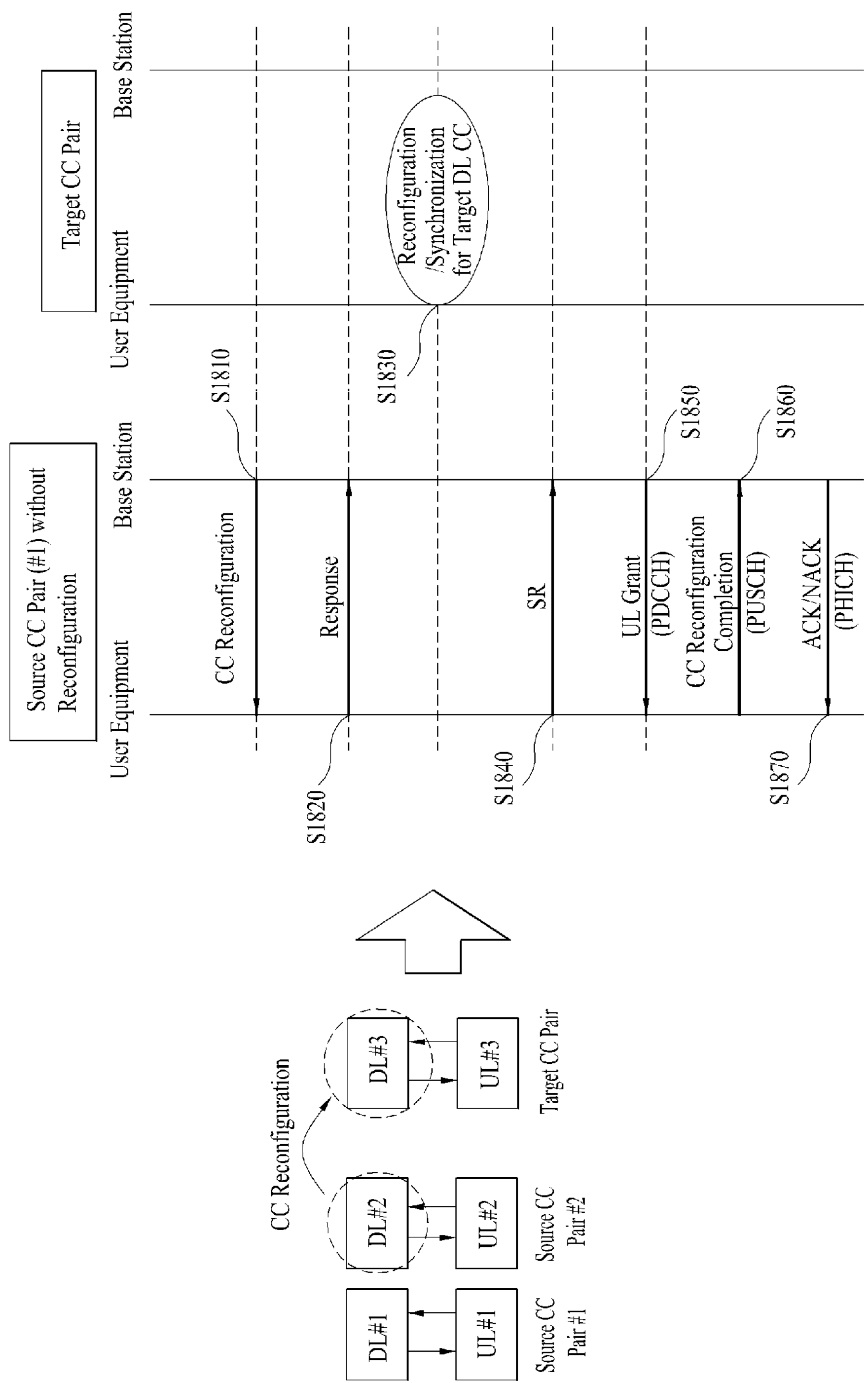

FIG. 16~18 respectively illustrate further exemplary methods for performing CC reconfiguration according to an exemplary embodiment of the present invention. This exemplary embodiment of the present invention shows a case when the number (M) of DL/UL CC pairs, which can be configured by the user equipment, is greater than the number (K) of reconfigured DL/UL CC pairs (i.e., M>K). When M>K, among all CC pairs, a portion of the source CC pairs are not processed with CC reconfiguration in the DL and the UL. In this case, among all of the CC pairs, source CC pairs and target CC pairs both maintaining their RRC configuration may be pre-decided by the base station and may be delivered in advance to the user equipment through the CC reconfiguration command. In this case, it may be proposed to consider three different solutions for transmitting CC reconfiguration completion/response.

First of all, the user equipment may transmit a signaling for CC reconfiguration completion through a (pre-decided) target UL CC, and the respective response may be received through a pre-decided target DL CC.

Secondly, the user equipment may transmit a signaling for CC reconfiguration completion through a (pre-decided) target UL CC, and the respective response may be received through a source DL CC or a target DL CC, or the respective response may be received through both the source DL CC and the target DL CC.

Thirdly, after performing reconfiguration/synchronization on the target DL CC, the base station may request for a report on the CC reconfiguration to the user equipment through a pre-decided source DL CC. Thereafter, the user equipment may transmit a response signal for the CC reconfiguration completion to the base station through a (pre-decided) source UL CC. Most particularly, since the configuration for the (pre-decided) source CC pair is maintained during the CC reconfiguration, a request/response signal on the CC reconfiguration report may be transmitted and received by using a general PDCCH/PUSCH.

FIG. 16 illustrates an example of performing the above-described first solution. Referring to FIG. 16, the base station transmits a CC reconfiguration command to the user equipment through a source DL CC (DL #1) having no CC reconfiguration (S1610). The user equipment transmits a response signal respective to the CC reconfiguration command through a source UL CC (UL #1) having no CC reconfiguration (S1620). Herein, step S1620 may be omitted. Thereafter, the user equipment performs reconfiguration/resynchronization on a target DL CC (DL #3) (S1630). Then, in order to indicate a response to the CC reconfiguration completion, the user equipment transmits a dedicated RACH preamble to the base station through a target UL CC (UL #3) (S1640). Afterwards, the base station transmits a signal indicating the response to the CC reconfiguration completion (e.g., PDCCH) to the user equipment through the target DL CC (DL #3) (S1650). The PDCCH may carry PDSCH/PUSCH scheduling information (normal PUCCH), or the PDCCH may not carry any scheduling information (pure PDCCH).

FIG. 17 illustrates an example of performing the above-described second solution. Referring to FIG. 17, the base station transmits a CC reconfiguration command to the user equipment through a source DL CC (DL #1) having no CC reconfiguration (S1710). The user equipment transmits a response signal respective to the CC reconfiguration command through a source UL CC (UL #1) having no CC reconfiguration (S1720). Herein, step S1720 may be omitted. Thereafter, the user equipment performs reconfiguration/resynchronization on a target DL CC (DL #3) (S1730). Then, in order to indicate a response to the CC reconfiguration completion, the user equipment transmits a dedicated RACH preamble to the base station through a target UL CC (UL #1) having no CC reconfiguration (S1740). Afterwards, the base station transmits a signal indicating the response to the CC reconfiguration completion (e.g., PDCCH) to the user equipment through the target DL CC (DL #1) having no CC reconfiguration (S1750). The PDCCH may carry PDSCH/PUSCH scheduling information (normal PUCCH), or the PDCCH may not carry any scheduling information (pure PDCCH).

FIG. 18 illustrates another example of performing the above-described second solution. Referring to FIG. 18, the base station transmits a CC reconfiguration command to the user equipment through a source DL CC (DL #1) having no CC reconfiguration (S1810). The user equipment transmits a response signal respective to the CC reconfiguration command through a source UL CC (UL #1) having no CC reconfiguration (S1820). Herein, step S1820 may be omitted. Thereafter, the user equipment performs reconfiguration/resynchronization on a target DL CC (DL #3) (S1830). Then, in order to ensure uplink resource for transmitting a CC reconfiguration completion (message), the user equipment transmits to the base station a Scheduling Request (SR) through a source UL CC (UL #1) having no CC reconfiguration to the base station (S1840). In case of the source CC, since the base station and the user equipment should be synchronized, it may be possible to ensure (or acquire) resource dedicated for transmitting CC reconfiguration completion (message) by using the SR, as shown in FIG. 10. Herein, for example, the SR corresponds to a 1-bit information being transmitted by ON/OFF keying, and the SR is transmitted through the PUCCH. The base station receives the SR from the user equipment, and, then, the base station transmits a UL grant to the user equipment through the PDCCH (S1850). Subsequently, the user equipment uses an uplink transmission resource designated by the UL grant so as to transmit the CC reconfiguration completion (message) to the base station (S1860). The CC reconfiguration completion (message) may be an RRC message. After receiving the CC reconfiguration completion (message) from the user equipment, the base station may transmit an ACK/NACK to the user equipment in order to indicate whether or not the CC reconfiguration completion (message) has been correctly received (S1870). Herein, the ACK/NACK may be transmitted through a PHICH.

Figure 19:
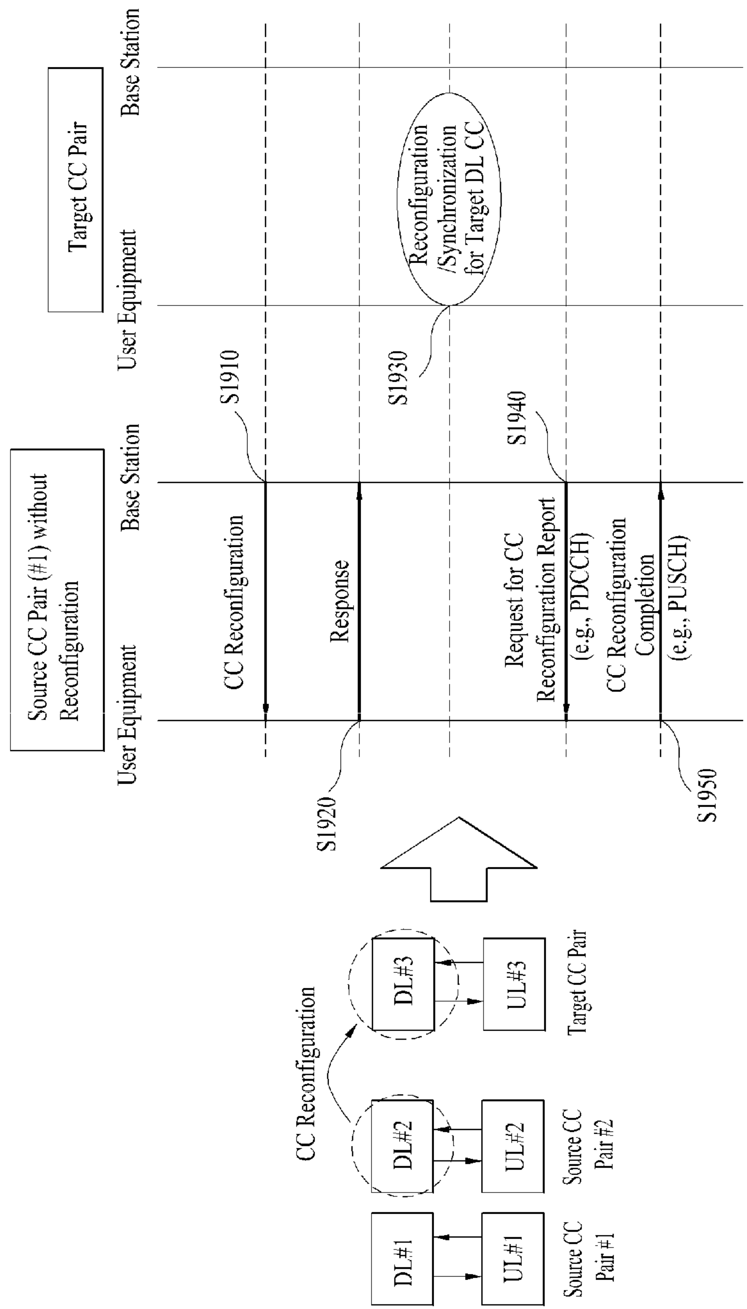

FIG. 19 illustrates an example of performing the above-described third solution. Referring to FIG. 19, the base station transmits a CC reconfiguration command to the user equipment through a source DL CC (DL #1) having no CC reconfiguration (S1910). The user equipment transmits a response signal respective to the CC reconfiguration command through a source UL CC (UL #1) having no CC reconfiguration (S1920). Herein, step S1920 may be omitted. Thereafter, the user equipment performs reconfiguration/resynchronization on a target DL CC (DL #3) (S1930). After receiving the response message in step S1920, when a predetermined period of time has elapsed, or when a predetermined condition has occurred (e.g., event-triggering), the base station may transmit a request for a report on the CC reconfiguration to the user equipment through a source DL CC (DL #1) having no CC reconfiguration (S1940). Subsequently, the user equipment may transmit a response for the CC reconfiguration completion to the base station through a source UL CC (DL #1) having no CC reconfiguration (S1950). The request/response signal on the CC reconfiguration report may be transmitted and received by using a general PDCCH/PUSCH.

Although it is shown in FIGS. 13-19 that the CC reconfiguration command/response, the CC reconfiguration report request/response or the CC reconfiguration completion are being transmitted and received through a source CC pair having no CC reconfiguration, this is merely exemplary. Therefore, all or only a portion of the signals for the CC reconfiguration may be transmitted and received through a source CC pair having CC reconfiguration occurring therein. Also, although the descriptions of FIGS. 13~19 are focused on cases where the CC is being changed for simplicity, this is merely exemplary. And, therefore, the present invention may be easily varied and applied to cases where a new CC is added and to cases where some of the CCs are received from the predetermined CCs. Furthermore, the examples shown in FIGS. 13~19 may be applied in combination.

Figure 20:
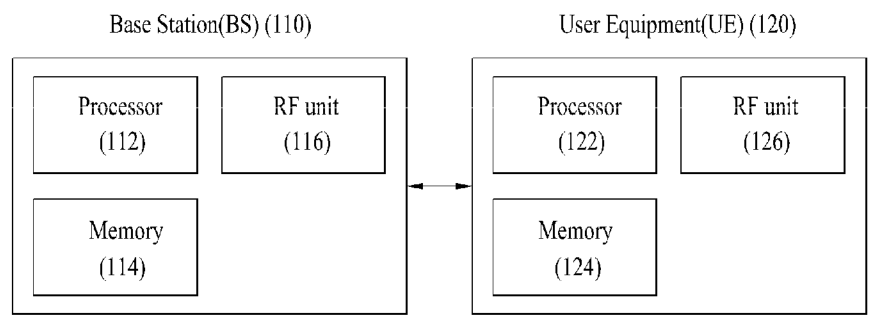
FIG. 20 illustrates an exemplary base station and an exemplary user terminal that can be applied to the embodiment of the present invention.

FIG. 20 illustrates an exemplary base station and an exemplary user terminal that can be applied to the embodiment of the present invention.

Referring to FIG. 20, a wireless communication system includes a base station (BS, 110) and a user equipment (UE, 120). In a downlink, the transmitter corresponds to a portion of the base station (110), and the receiver corresponds to a portion of the user equipment (120). In an uplink, the transmitter corresponds to a portion of the user equipment (120), and the receiver corresponds to a portion of the base station (110). The base station (110) includes a processor (112), a memory (114), and a Radio Frequency (RF) unit (116). The processor (112) may be configured to realize procedures and/or methods proposed in the present invention. The memory (114) is connected to the processor (112) and stores diverse information related to the operation of the processor (112). The RF unit (116) is connected to the processor (112) and transmits and/or receives radio signals. The user equipment (120) includes a processor (122), a memory (124), and an RF unit (126). The processor (122) may be configured to realize procedures and/or methods proposed in the present invention. The memory (124) is connected to the processor (122) and stores diverse information related to the operation of the processor (122). The RF unit (126) is connected to the processor (122) and transmits and/or receives radio signals. The base station (110) and/or the user equipment (120) may be equipped with a single antenna or multiple antennae. Also, although it is not shown in the drawing, the user equipment (10) may further include at least one of a power management module, a battery, a display, a keypad, a SIM card (option), a speaker, and a microphone.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the base station and the user equipment. A specific operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as a fixed station, Node B, eNode B (eNB), access point, and so on. Also, the terminal may be replaced with terms such as UE (User Equipment), MS (Mobile Station), MSS (Mobile Subscriber Station), and so on.

The embodiments according to the present invention can be implemented by various means, for example, hardware, firmware, software, or their combination. If the embodiment according to the present invention is implemented by hardware, the embodiment of the present invention can be implemented by one or more ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

Industrial Applicability

The present invention may be applied in a wireless communication system. More specifically, the present invention may be applied to a method and apparatus for reconfiguring carriers in a multiple carrier aggregation situation.

What is claimed is:

1. A method of reconfiguring Component Carriers (CCs) at a user equipment (UE) in a wireless communication system supporting carrier aggregation, the method comprising:

receiving a CC reconfiguration command from a base station (BS) through a downlink (DL) CC of a plurality of first CCs;

reconfiguring serving CCs by changing at least one of the first CCs to one or more second CCs according to the CC reconfiguration command; and transmitting a dedicated random access preamble to the BS after the serving CCs are reconfigured, the dedicated random access preamble indicating that reconfiguration of serving CCs has been completed, wherein, when M>K (the M is a number of the first CCs and the K is a number of Reconfigured CCs of the first CCs), the dedicated random access preamble is transmitted through a non-reconfigured uplink (UL) CC, among the plurality of the first CCs, and wherein, when M=K, the dedicated random access preamble is transmitted through a UL CC of the second CCs.

2. The method of claim 1, further comprising:

after transmitting the dedicated random access preamble, receiving a PDCCH (Physical Downlink Control Channel) indicating a response to the reconfiguration of serving CCs completion.

3. The method of claim 2, wherein the PDCCH does not include scheduling information.

4. The method of claim 1, further comprising:

receiving a request signal requesting for information on a CC reconfiguration status from the base station, and wherein the dedicated random access preamble indicating that the CC reconfiguration has been completed corresponds to a response to the request signal being transmitted to the base station.

5. A user equipment, comprising:

a radio frequency (RF) unit configured to transmit and receive radio signals to and from a base station (BS), the BS supporting carrier aggregation; and a processor configured to:

receive a component carrier (CC) reconfiguration command from the BS through a downlink (DL) CC of a plurality of first CCs, reconfigure serving CCs by changing at least one of the first CCs to one or more second CCs according to the CC reconfiguration command, and transmit a dedicated random access preamble to the BS after the serving CCs are reconfigured, the dedicated random access preamble indicating that reconfiguration of the serving CCs has been completed, wherein, when M>K (the M is a number of the first CCs and the K is a number of reconfigured CCs of the first CCs), the dedicated random access preamble is transmitted through a non-reconfigured uplink (UL) CC, among the plurality of the first CCs, and wherein, when M=K, the dedicated random access preamble is transmitted through a UL CC of the second CCs.

6. The user equipment of claim 5, wherein the processor is further configured to receive a PDCCH (Physical Downlink Control Channel) indicating a response to the reconfiguration of the serving CCs completion, after transmitting the dedicated random access preamble.

7. The user equipment of claim 6, wherein the PDCCH does not include scheduling information.

8. The user equipment of claim 5, wherein the processor is further configured to receive a request signal requesting for information on a CC reconfiguration status from the base station, and wherein the dedicated random access preamble indicating that the CC reconfiguration has been completed corresponds to a response to the request signal being transmitted to the base station.

* * * * *